US011060559B2

(12) United States Patent
Snively et al.

(10) Patent No.: US 11,060,559 B2
(45) Date of Patent: Jul. 13, 2021

(54) BI-METALLIC JOURNAL BEARING WITH ADDITIVE MANUFACTURED SLEEVE

(71) Applicant: EATON INTELLIGENT POWER LIMITED, Dublin (IE)

(72) Inventors: Kelsey Michael Snively, Cleveland Heights, OH (US); Sean Brown, Boston, MA (US); Ronald Nyzen, Chardon, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/432,693

(22) Filed: Jun. 5, 2019

(65) Prior Publication Data

US 2019/0376557 A1 Dec. 12, 2019

Related U.S. Application Data

(60) Provisional application No. 62/683,439, filed on Jun. 11, 2018.

(51) Int. Cl.
*F16C 17/02* (2006.01)
*F16C 33/08* (2006.01)
(Continued)

(52) U.S. Cl.
CPC .............. *F16C 33/08* (2013.01); *F01C 21/02* (2013.01); *F16C 17/02* (2013.01); *F16C 33/121* (2013.01);
(Continued)

(58) Field of Classification Search
CPC ........ F16C 17/02; F16C 33/08; F16C 33/121; F16C 33/14; F16C 35/02; F16C 2204/20;
(Continued)

(56) References Cited

U.S. PATENT DOCUMENTS 1,785,495 A * 12/1930 Clement ................ B21D 28/34
279/97
3,128,710 A * 4/1964 Blomgren ............... F04C 2/086
417/310
(Continued)

FOREIGN PATENT DOCUMENTS

CN 201730960 U 2/2011
CN 202040204 U * 11/2011 .............. F16C 17/12
(Continued)

OTHER PUBLICATIONS

GB1908286.6—Search Report Under Section 17(5), dated Nov. 28, 2019.

*Primary Examiner* — Marcus Charles
(74) *Attorney, Agent, or Firm* — Fay Sharpe LLP

(57) ABSTRACT

A bi-metallic bearing assembly is provided for an associated pump. The bearing assembly includes a sleeve formed of a first metal, and having at least one opening therein, and an insert formed of a different, second metal, wherein the insert is received in the sleeve opening. The sleeve is preferably formed using an additive manufacturing process. The insert and/or a separate face plate are preferably formed through a machining process, and the insert is mechanically joined to the sleeve, and the face plate is preferably mechanically joined to the sleeve and also advantageously retains the insert in the sleeve.

21 Claims, 3 Drawing Sheets

(51) Int. Cl.
*F16C 33/12* (2006.01)
*F16C 33/14* (2006.01)
*F16C 35/02* (2006.01)
*F01C 21/02* (2006.01)
*B33Y 80/00* (2015.01)

(52) U.S. Cl.
CPC .............. *F16C 33/14* (2013.01); *F16C 35/02* (2013.01); *B33Y 80/00* (2014.12); *F16C 2204/16* (2013.01); *F16C 2204/20* (2013.01); *F16C 2204/42* (2013.01); *F16C 2360/00* (2013.01)

(58) Field of Classification Search
CPC .............. F16C 2204/42; F16C 2360/00; F16C 2360/23; F01C 21/02; F04C 15/00; F04C 2/082; F04C 2/18; F16J 15/406; B33Y 80/00
USPC ........... 384/191, 2, 275–275, 280, 282, 290; 418/70, 133, 206.5, 206.7, 206.9; 417/310
See application file for complete search history.

(56) References Cited

U.S. PATENT DOCUMENTS

| | | | | |
|---|---|---|---|---|
| 3,622,212 A | * | 11/1971 | Laumont | F04C 15/0088 384/398 |
| 4,268,232 A | * | 5/1981 | Haupt | F16J 15/40 277/353 |
| 4,395,207 A | * | 7/1983 | Manttari | F04C 2/086 418/102 |
| 5,052,905 A | * | 10/1991 | Rustige | F04C 15/0026 418/132 |
| 5,317,894 A | * | 6/1994 | Southard | B21D 28/34 279/97 |
| 5,391,068 A | * | 2/1995 | Uppal | F04C 2/086 418/133 |
| 7,150,612 B2 | * | 12/2006 | Komatsu | F04C 2/086 418/206.1 |
| 2010/0266437 A1 | * | 10/2010 | Martin-Dye | F04C 2/18 418/191 |
| 2017/0067367 A1 | * | 3/2017 | Wojcik | F01D 15/12 |
| 2018/0051743 A1 | * | 2/2018 | Yates | F16C 17/04 |

FOREIGN PATENT DOCUMENTS

| | | | | |
|---|---|---|---|---|
| CN | 202040204 U | | 11/2011 | |
| CN | 202118482 U | * | 1/2012 | ............ F16N 13/20 |
| CN | 202971579 U | | 6/2013 | |
| CN | 103982548 A | | 8/2014 | |
| CN | 104379934 A | * | 2/2015 | ............. F04C 18/16 |
| CN | 204663874 U | * | 9/2015 | ................ F01C 2/14 |
| CN | 204851632 U | * | 12/2015 | ................ F04C 2/18 |
| CN | 105436813 A | * | 3/2016 | ................ B21P 3/00 |
| CN | 205401468 U | * | 7/2016 | ............. F16C 35/02 |
| CN | 106667544 A | * | 5/2017 | ......... A61B 17/1671 |
| CN | 106762612 U | * | 5/2017 | ................ F04C 2/18 |
| CN | 107781291 A | * | 3/2018 | ............. F16C 17/04 |
| CN | 207470425 U | * | 6/2018 | ................ F04C 2/14 |
| CN | 207470426 U | * | 6/2018 | ................ F04C 2/14 |
| CN | 108533627 A | * | 9/2018 | ................ F16D 3/02 |
| DE | 3500673 A | * | 7/1986 | ................ F04C 2/14 |
| DE | 10103281 A1 | * | 8/2002 | ............. F16C 17/02 |
| DE | 102016225826 A1 | * | 6/2018 | ............. F04C 15/00 |
| EP | 0620368 A2 | * | 10/1994 | ............. F01C 21/02 |
| EP | 1267076 A2 | * | 12/2002 | .......... F04C 15/0026 |
| EP | 2 182 211 B1 | | 11/2014 | |
| GB | 1355957 A | * | 6/1974 | .......... F04C 15/0026 |
| GB | 1448930 A | * | 9/1976 | ............. F04C 2/086 |
| WO | WO-2016166985 A1 | * | 10/2016 | ................ F04C 2/14 |

\* cited by examiner

BI-METALLIC JOURNAL BEARING WITH ADDITIVE MANUFACTURED SLEEVE

This application claims the priority benefit of U.S. provisional application Ser. No. 62/683,439, filed Jun. 11, 2018, the entire disclosure of which is incorporated herein by reference.

BACKGROUND

This invention relates to a journal bearing assembly that includes a unique sleeve formed by an additive manufacturing process (3D printing), a machined journal insert, and a machined face plate. For purposes of the present disclosure, the additive manufacturing process (sometimes referred to herein as three dimensional or 3D printing) generally refers to a manufacturing process in which material is joined and/or solidified, for example, under control of a processor or computer. Typically the additive manufacturing process adds layers of a liquid or powder that is fused to create a 3D component.

Existing journal bearings for fuel pump applications are solid, one-piece components machined from a desired metal material, such as stock leaded bronze material. Leaded bronze is preferably used because of its exceptional lubricity characteristics and performance in high temperature and high pressure environments. Unfortunately, the leaded bronze material is generally regarded as a heavy material and not particularly durable. In an environment such as an aircraft engine fuel pump, light weight is an important consideration in an effort to reduce overall weight of the aircraft. Similarly, durability is particularly desired in view of the anticipated length of service of the fuel pump. This type of bearing is also expensive to replace because in prior arrangements, the entire part is discarded if defects are detected at the time of pump inspection/overhaul.

A need exists for an improved arrangement that addresses at least one or more of the above-described undesired traits, as well as offering still other features and benefits over existing fuel pump designs.

SUMMARY

A unique sleeve used in the present bearing (or bearing assembly) allows for weight savings and strength features as compared to existing bearings (or bearing assemblies). A machined insert and a machined face plate allow for use of a different material than that used in the sleeve, hence the new bearing is sometimes referred to herein as a bi-metallic bearing.

The subject bearing assembly utilizes a lighter, and preferably stronger material for the sleeve (main structure) of the bearing. The insert and the face plate assemble to the sleeve. The insert and face plate are the primary functioning pieces or portions of the bearing assembly as they interact with the pump gears.

The insert and the face plate are preferably made of a different metal material than the metal material that forms the sleeve where the different material advantageously displays the lubricity of leaded bronze.

The different material forming the insert and face plate is also preferably more durable than leaded bronze. Improved durability helps the bearing resist pump cavitation damage, thus improving pump life and performance.

Also, because the pump insert and face plate are separate components from the sleeve, service cost can be greatly reduced by allowing individual component replacement, e.g., replace one or more of the individual components that together form the bearing assembly at overhaul instead of having to replace the entire bearing.

Still other benefits and advantages of the present disclosure will become more apparent from reading and understanding the following detailed description.

DETAILED DESCRIPTION

Figure 1:
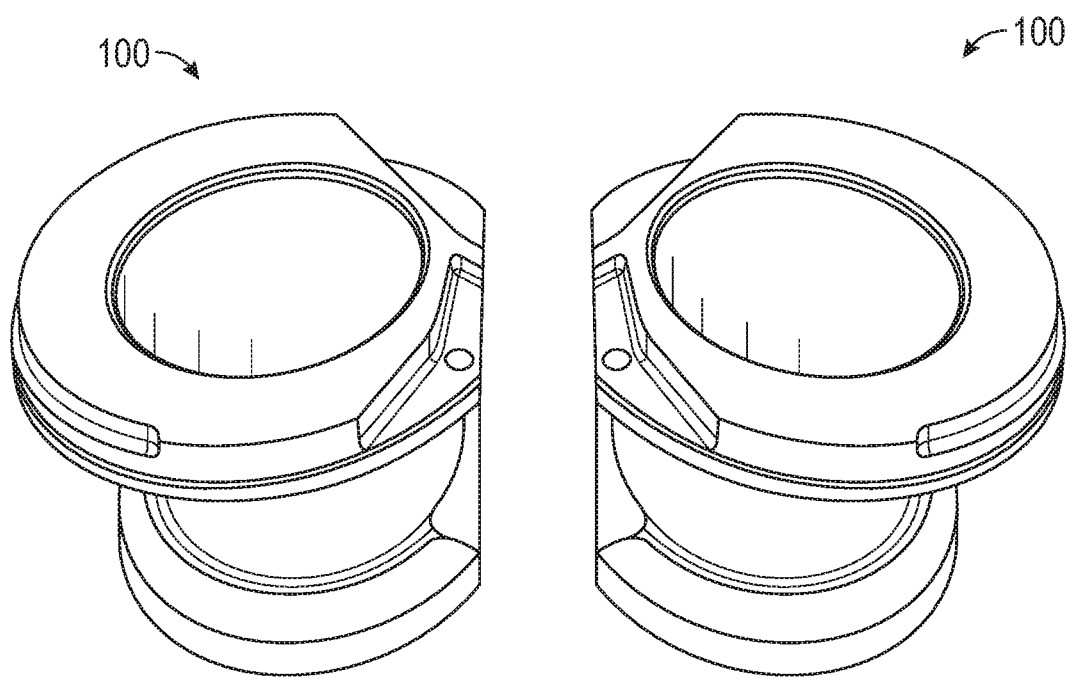
FIG. 1 is a perspective view of first and second bearings associated with a prior art fuel pump, i.e. gear pump.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.). The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

The bearing assembly shown and described herein is preferably intended for use in an aircraft main engine fuel pump and can come in a single or double configuration, the single configuration supporting one drive shaft while the double configuration supports first and second shafts. The single or double configuration is not as important as the invention relates to the bearing construction. Therefore, although the drawings show a double configuration, the features, advantages, and benefits described herein and offered thereby are equally applicable to the single configuration unless specifically noted otherwise.

Turning to FIG. 1, there is shown a prior art bearing arrangement, namely first and second individual bearings 100 that are bearings associated with a fuel pump such as a gear pump for an aircraft engine. The remaining components of the fuel pump/gear pump and the aircraft engine are not shown and described herein since they are well-known in the art. Each individual bearing 100 is machined from a metal material that has desired lubricity characteristics i.e., a low friction coefficient, and preferably high thermal conductivity. For example, one commonly used material that has these characteristics is a leaded bronze alloy machined to the desired configuration. Again, particular details of the bearing shape/configuration are well known in the art and are not specifically described herein for purposes of brevity. Although the prior bearing arrangement of FIG. 1 exhibits a low friction coefficient, high thermal conductivity, and a coefficient of thermal expansion (CTE) that is similar to the gear housing, there are also related areas where improvement is desired. For example, weight is one design concern. The leaded bronze material is generally deemed to have a low cavitation resistance i.e., less durability than desired. Further, the machined bearing still requires hand lapping to attain the final desired configuration of the bearing(s).

Figure 2:
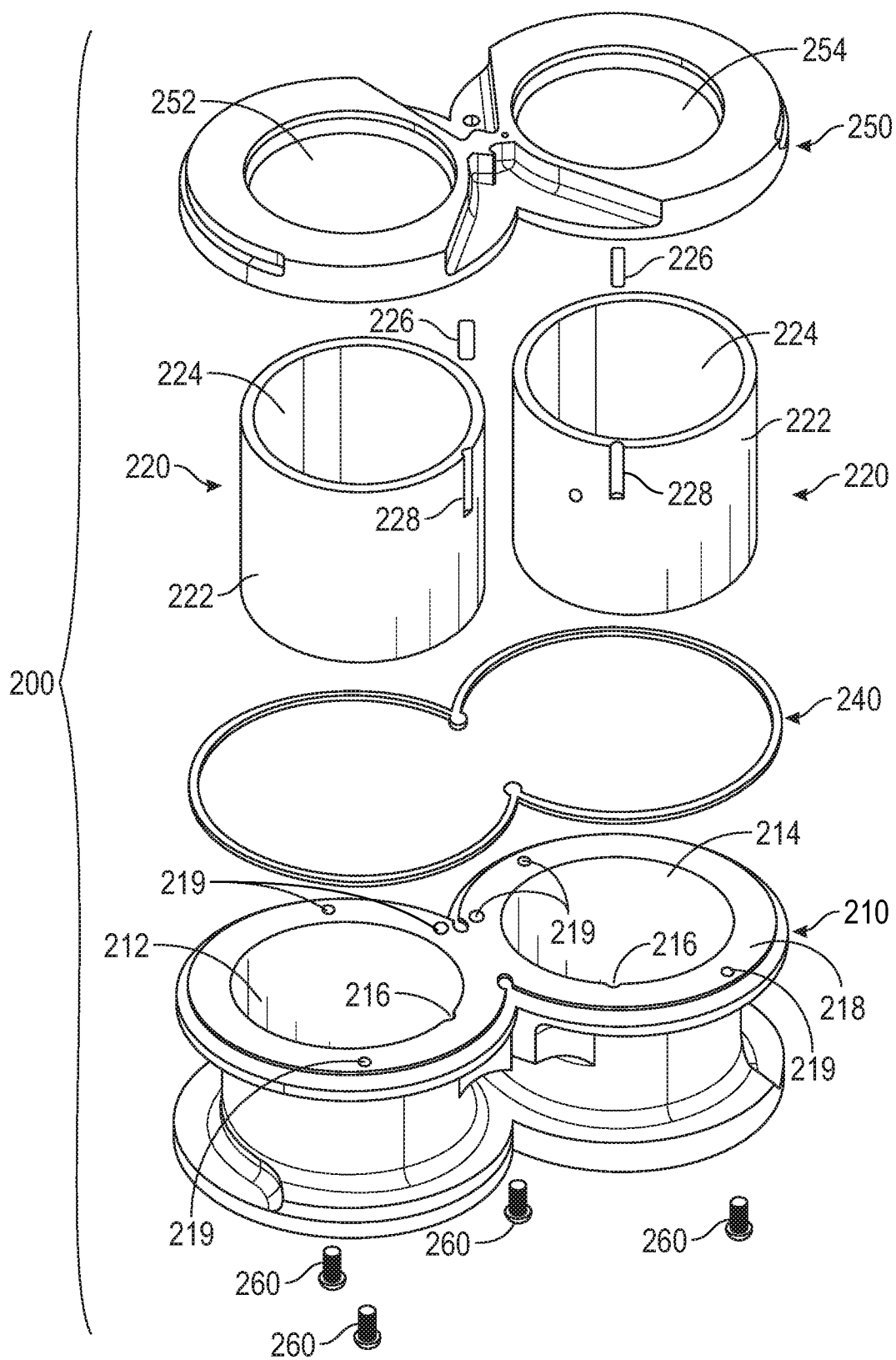
FIG. 2 is an exploded perspective view of a bearing of the present disclosure.
Figure 3:
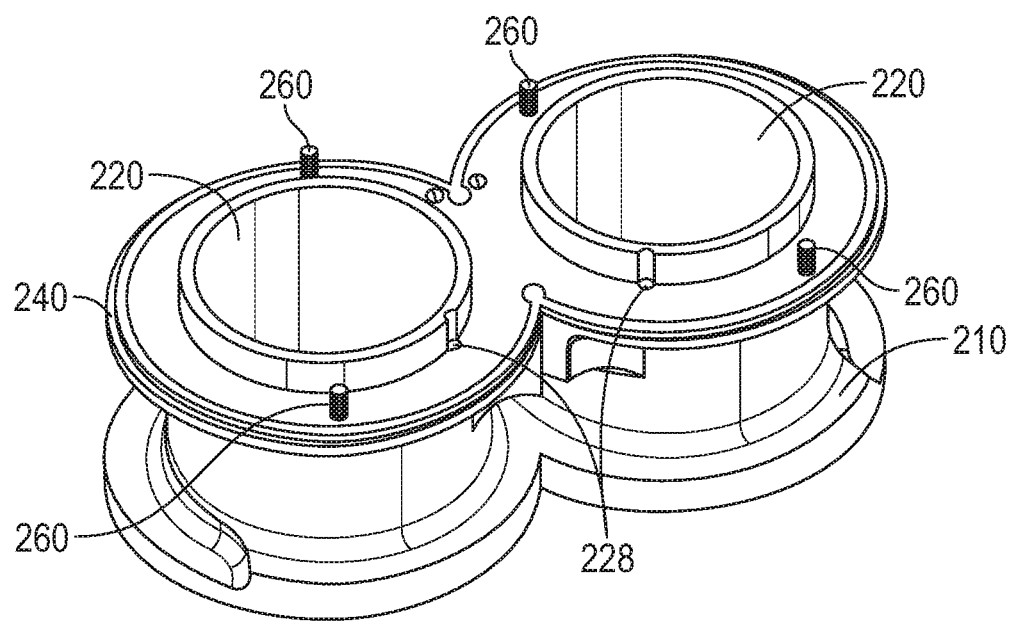
FIG. 3 is a perspective view of a partially assembled bearing of the present disclosure.
Figure 4:
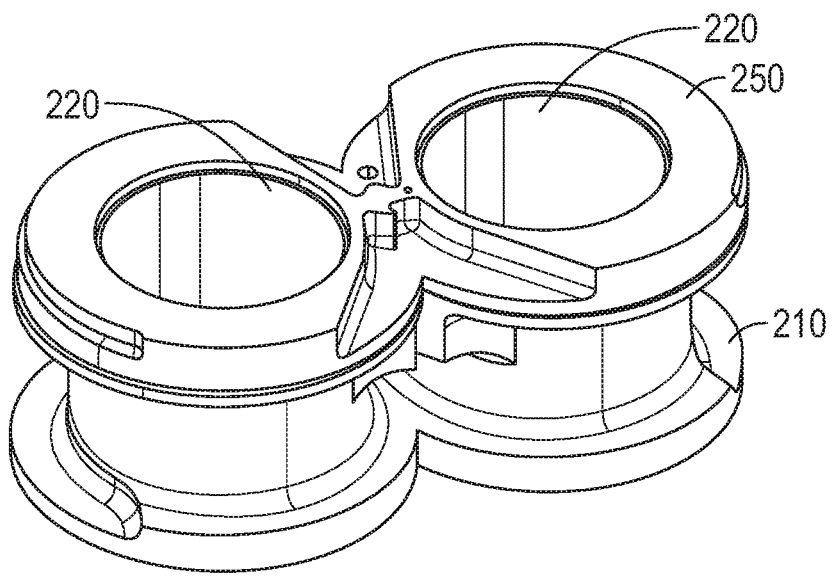
FIG. 4 is a perspective view of the completely assembled bearing of the present disclosure.

FIGS. 2-4 illustrate a multi-piece or multi-part bearing or bearing assembly 200 of the present disclosure. Particularly, the bearing 200 includes a first portion or sleeve such as a one-piece sleeve 210 preferably formed through an additive manufacturing process or 3-D printing process. Generally, the additive manufacturing process/3-D printing process is known whereby a processor/computer directs the depositing of layers of material in a prescribed configuration and fuses these layers together to form an integral structure of the sleeve 210. The sleeve 210 has first and second inner cylindrical openings 212, 214 in this double configuration of the bearing where the cylindrical surfaces of the sleeve defining the openings that are dimensioned to receive shafts (not shown) associated with a traditional gear pump, for example, used as a fuel pump in, for example, an aircraft engine. Recess or groove 216 is formed in the outer surface of the sleeve 210 for reasons to be described in greater detail below. The sleeve 210 is preferably printed from metallic powder, such as either an aluminum or titanium alloy although the particular material may vary depending on the end use, using a direct metal laser sintering printer. Advantageously, the sleeve 210 can be made through the additive manufacturing process to have a high level of precision (e.g., forming end flanges, contours of surfaces, bearing flow passages, recesses, grooves, etc., to facilitate assembly of the different components of the bearing, etc.) and thereby limit any subsequent machining of the final sleeve.

Journal inserts 220, preferably made from leaded bronze or a similar metal material such as Toughmet or bismuth bronze, are preferably machined into a desired configuration to form other portions or component(s) of the bearing 200, it being understood that description of one journal insert applies to the other insert unless specifically noted otherwise. The configuration of each insert 220 is generally illustrated as an annular cylinder open at opposite ends, where an outer surface 222 of the insert is dimensioned for receipt in one of the openings 212, 214 of the double configuration sleeve 210, and an inner surface 224 defines the through opening dimensioned to receive one of the shafts (not shown) of the pump. Preferably the individual journal inserts 220 are press fit into the respective openings 212, 214 of the sleeve 210. To maintain the inserts 220 within the sleeve 210, a suitable mechanical connection is made between the separate components. One preferred mechanical connection uses a retainer such as a dowel pin 226 (preferably one pin for each journal insert received in a respective opening 212, 214). Preferably, the outer surface 222 of each journal insert 220 includes a recess or groove 228 that is circumferentially aligned with the similarly sized and similarly positioned recess or groove 216 formed in the walls of the journal sleeves 210 that form the openings 212, 214. As will be understood by one skilled in the art, the pins 226 are suitably dimensioned along with each of the cooperating recesses/grooves 216, 228 so that once the inserts 220 are positioned within the respective openings 212, 214 in the sleeve 210, the pins 226 prevent movement of the journal inserts 220 with respect to the sleeve, particularly to prevent rotational movement of the journal inserts relative to the sleeve.

A seal member such as an o-ring 240 is installed on the outer perimeter of a top surface 218 of the sleeve 210 and is another portion or component of the bearing. Preferably, the top surface 218 of the sleeve 210 has a recess such as a peripheral recess dimensioned to receive the o-ring 240. Since this illustrated embodiment is a double configuration bearing assembly, the o-ring 240 has a generally figure eight configuration, although other conformations that provide effective sealing between adjacent, abutting components can be used without departing from the scope and intent of the present disclosure.

A face plate 250, also preferably made from leaded bronze or similar material such as Toughmet or bismuth bronze, defines another portion or component of the bearing 200.

The face plate 250 is installed onto the top surface 218 of the sleeve 210. The face plate 250 fits over one end of the journal inserts 220 and prevents any axial motion of the inserts relative to the sleeve 210. Further, the face plate 250 has suitable openings 252, 254 that align with the openings formed by inner surfaces 224 in each journal insert 220 in order to receive the gear pump shafts. To secure the face plate 250, preferably a mechanical connection is provided such as one or more (typically multiple) fasteners such as screws 260 that are installed through aligned fastener receiving openings 219 in the sleeve 210 and into threaded recesses (not shown) in the underside of the face plate 250.

Preliminary analysis indicates that the final design will result in approximately 40% weight reduction of the bearing shown in FIGS. 2-4 when compared with the prior art bearing of FIG. 1. Even if the face plate 250 and journal inserts 220 are formed as a lead bronze material, it is estimated that the final bearing assembly 200 will have approximately 55% less leaded bronze than the prior art bearing 100. As particularly evident from the exploded view of FIG. 2, the individual components that cooperate to form the final bearing assembly 200 also facilitate ease of overhaul since only those selected portions requiring replacement need to be actually replaced (whereas in the prior art arrangement, the entire bearing was discarded).

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

What is claimed is:

1. A bi-metallic bearing assembly for an associated pump, the bearing assembly comprising:
   a sleeve formed of a first metal, and having at least one opening therein; and
   an insert formed of a different, second metal, and received in the sleeve opening;
   wherein the first metal is lighter weight than the second metal.

2. The bi-metallic bearing assembly of claim 1 further comprising a face plate located at a first end of the sleeve.

3. The bi-metallic bearing assembly of claim 2 wherein the face plate is a separate component from the insert.

4. The bi-metallic bearing assembly of claim 2 further comprising a mechanical connection for joining the face plate to the sleeve.

5. The bi-metallic bearing assembly of claim 2 wherein the face plate is formed of the second metal that forms the insert.

6. The bi-metallic bearing assembly of claim 1 further comprising a mechanical connection for preventing rotation of the insert relative to the sleeve, wherein the insert is selectively inserted and removed from the sleeve by selectively connecting and disconnecting the mechanical connection.

7. The bi-metallic bearing assembly of claim 6 wherein the mechanical connection that connects the insert against movement relative to the sleeve includes a first recess in the insert and a second recess in the sleeve wherein the first and second recesses are located on the insert and sleeve, respectively align with each other and receive a pin dimensioned for receipt in the recesses.

8. The bi-metallic bearing assembly of claim 1 wherein the sleeve is formed at least in part of an aluminum or titanium alloy.

9. The bi-metallic bearing assembly of claim 8 wherein the insert is formed at least in part of leaded bronze material or a bismuth bronze.

10. The bi-metallic bearing assembly of claim 9 further comprising a face plate located at a first end of the sleeve, and wherein the face plate is formed at least in part of leaded bronze material.

11. A method of forming a bi-metallic bearing assembly for an associated pump, the method comprising:
    forming a sleeve formed of a first metal, and having at least one opening therein;
    separately forming an insert formed of a different, second metal, and dimensioning the insert for receipt in the sleeve opening, the first metal being lighter weight than the second metal;
    inserting the insert into the opening of the sleeve; and
    mechanically joining the insert to the sleeve.

12. The method of claim 11 wherein forming the sleeve includes using an additive manufacturing process.

13. The method of claim 11 wherein forming the insert includes a machining process.

14. The method of claim 11 further comprising forming a face plate located at a first end of the sleeve.

15. The method of claim 14 wherein the face plate forming step is a separate forming process from forming the sleeve.

16. The method of claim 15 further comprising mechanically joining the face plate to the sleeve.

17. The method of claim 11 further comprising mechanically joining the insert to the sleeve.

18. The method of claim 17 wherein the mechanically joining step further includes forming a first recess in an outer surface of the insert and forming a second recess in an inner surface of the sleeve, aligning the first and second recesses, providing a pin dimensioned for receipt in the aligned first and second recesses, and inserting a pin into the aligned first and second recesses to connect the insert against movement relative to the sleeve.

19. The method of claim 17 wherein the mechanically joining step further includes inserting a pin between the insert and sleeve to prevent movement between the insert and sleeve.

20. The method of claim 19 further comprising replacing the insert by removing the pin from between the insert and sleeve, withdrawing the insert from the sleeve, installing a new insert into the opening of the sleeve, and inserting a new pin between the insert and sleeve.

21. A bi-metallic bearing assembly comprising:
    a one-piece sleeve having an inner cylindrical opening extending therethrough, the sleeve formed from an aluminum or titanium alloy;
    a liner formed from a leaded bronze or bismuth bronze configured and dimensioned for selectively removable receipt in the sleeve opening;
    a first recess in an outer surface of the liner;
    a second recess in an inner surface of the sleeve wherein the first and second recesses are located and aligned adjacent to one another; and a pin received in the aligned first and second recesses to limit movement of the insert relative to the sleeve.

* * * * *